W. J. SCHMIDT.
NUT MAKING MACHINE.
APPLICATION FILED OCT. 7, 1914.
1,158,864.
Patented Nov. 2, 1915.
4 SHEETS—SHEET 4.
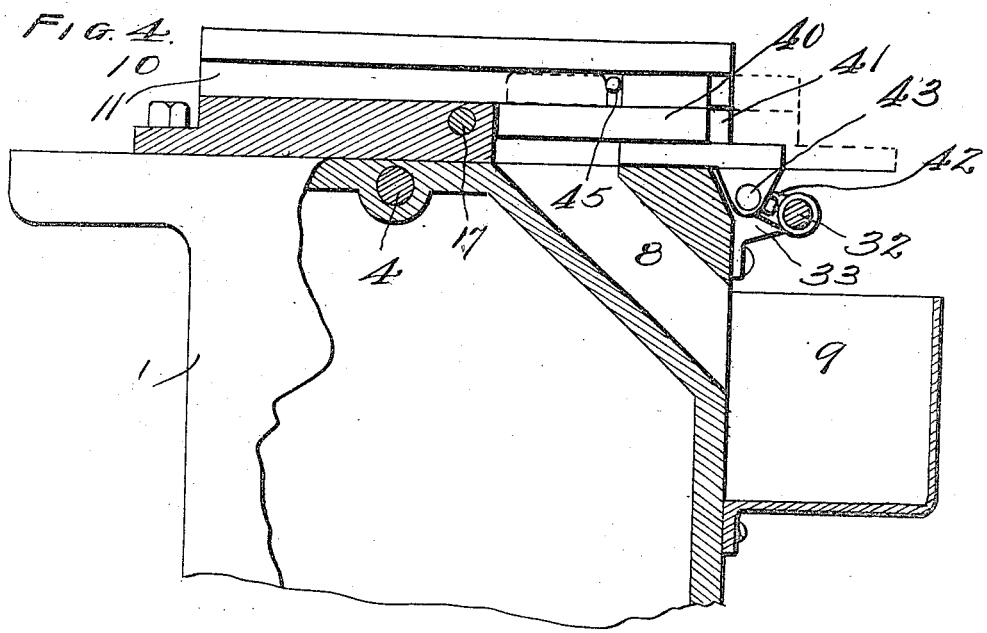
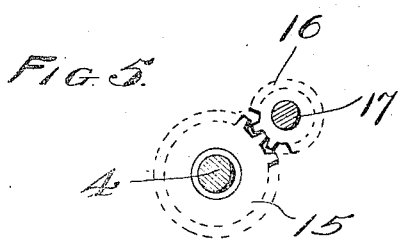
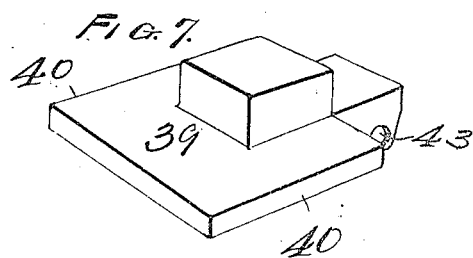
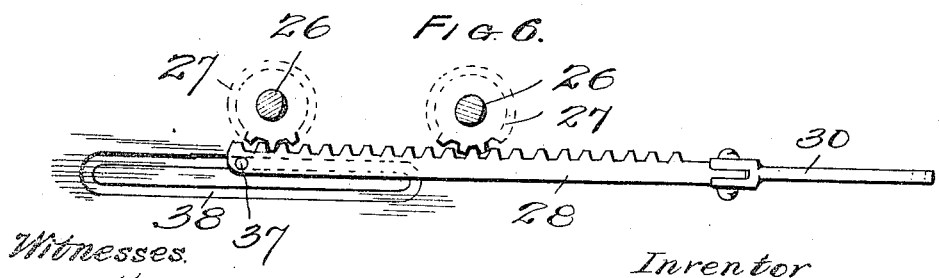
Witnesses.
C. K. Davis
M. L. Newcomb
Inventor
WALTER J. SCHMIDT
By Thomas R. Harney
Attorney

UNITED STATES PATENT OFFICE.

WALTER J. SCHMIDT, OF CLEVELAND, OHIO.

NUT-MAKING MACHINE.

1,158,864.  Specification of Letters Patent.  Patented Nov. 2, 1915.

Application filed October 7, 1914.  Serial No. 865,464.

*To all whom it may concern:*

Be it known that I, WALTER J. SCHMIDT, a citizen of the United States of America, residing at Cleveland, in the county of Cuyahoga and State of Ohio, have invented certain new and useful Improvements in Nut-Making Machines, of which the following is a specification.

My invention relates to improvements in nut making machines, and is designed to provide an efficient, rapid working and economical machine for punching nuts prior to threading.

While I have illustrated and briefly described hereinafter a shearing and crowning device in connection with my invention, it will be understood that I herein limit my claims to the punching device.

The object of the invention is to simplify the construction and operation of machines of this character, as hereinafter set forth, and the invention consists essentially in the combination and arrangement of means for feeding the stock or material into position to be acted upon by a simultaneously moving punch and shear or crowner, and means for disposing of the punched and forged nut.

In the accompanying drawings I have illustrated one complete example of the physical embodiment of my invention constructed according to the best mode I have so far devised for the practical application of the principles of my invention, but it will be understood that I may make minor or colorable changes or alterations in the machine within the scope of my appended claims without departing from the spirit of my invention.

Figure 1:
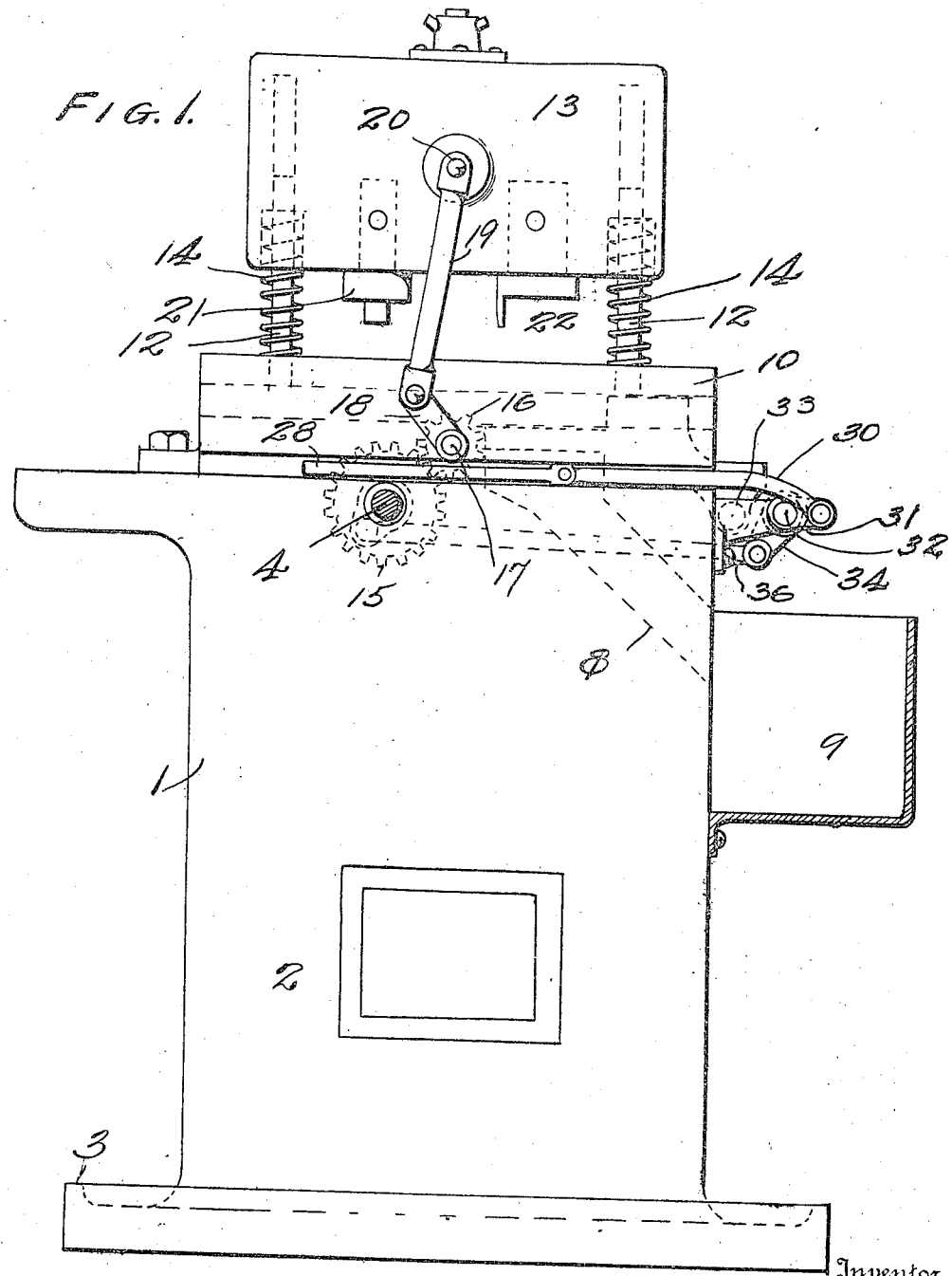
Figure 2:
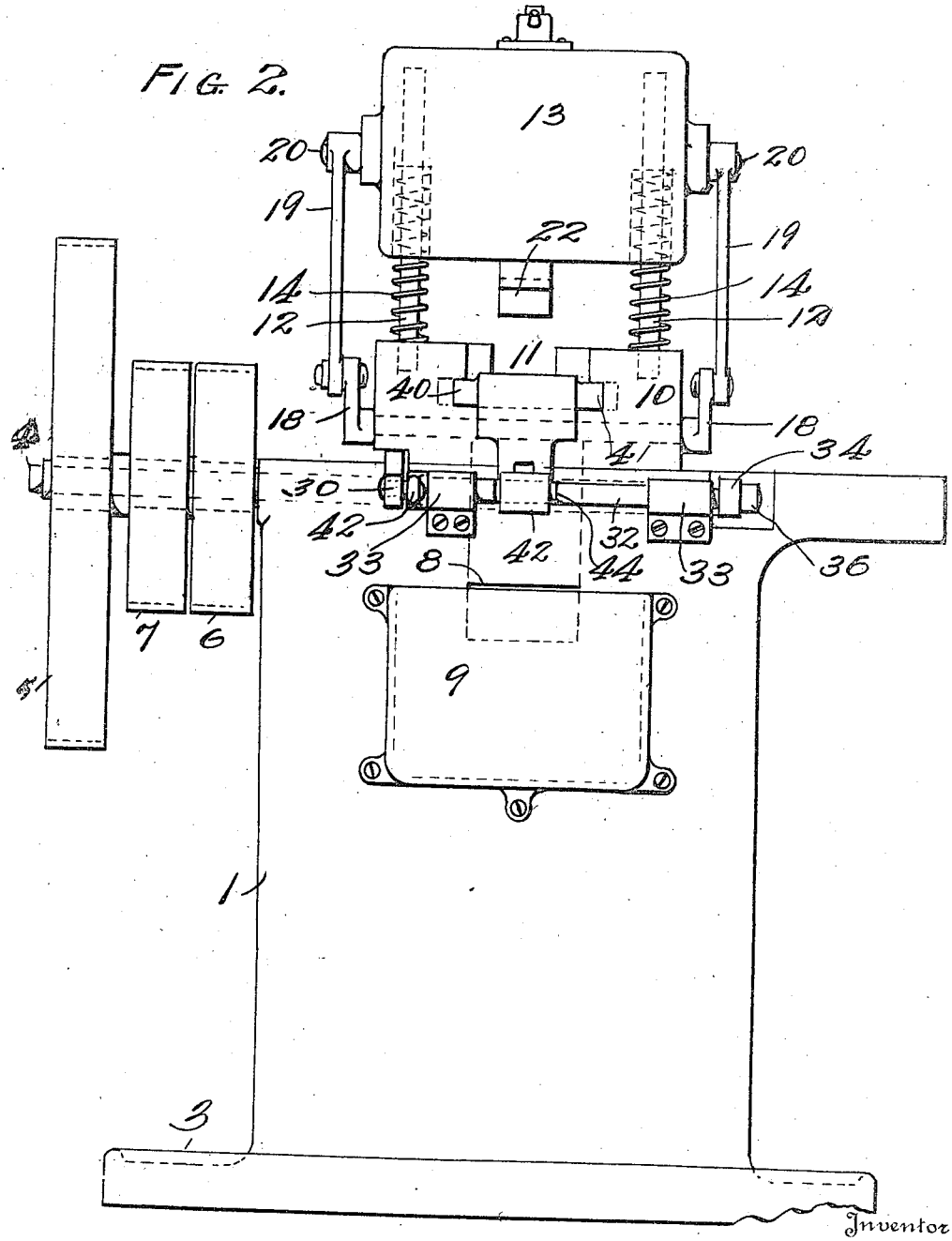
Figure 3:
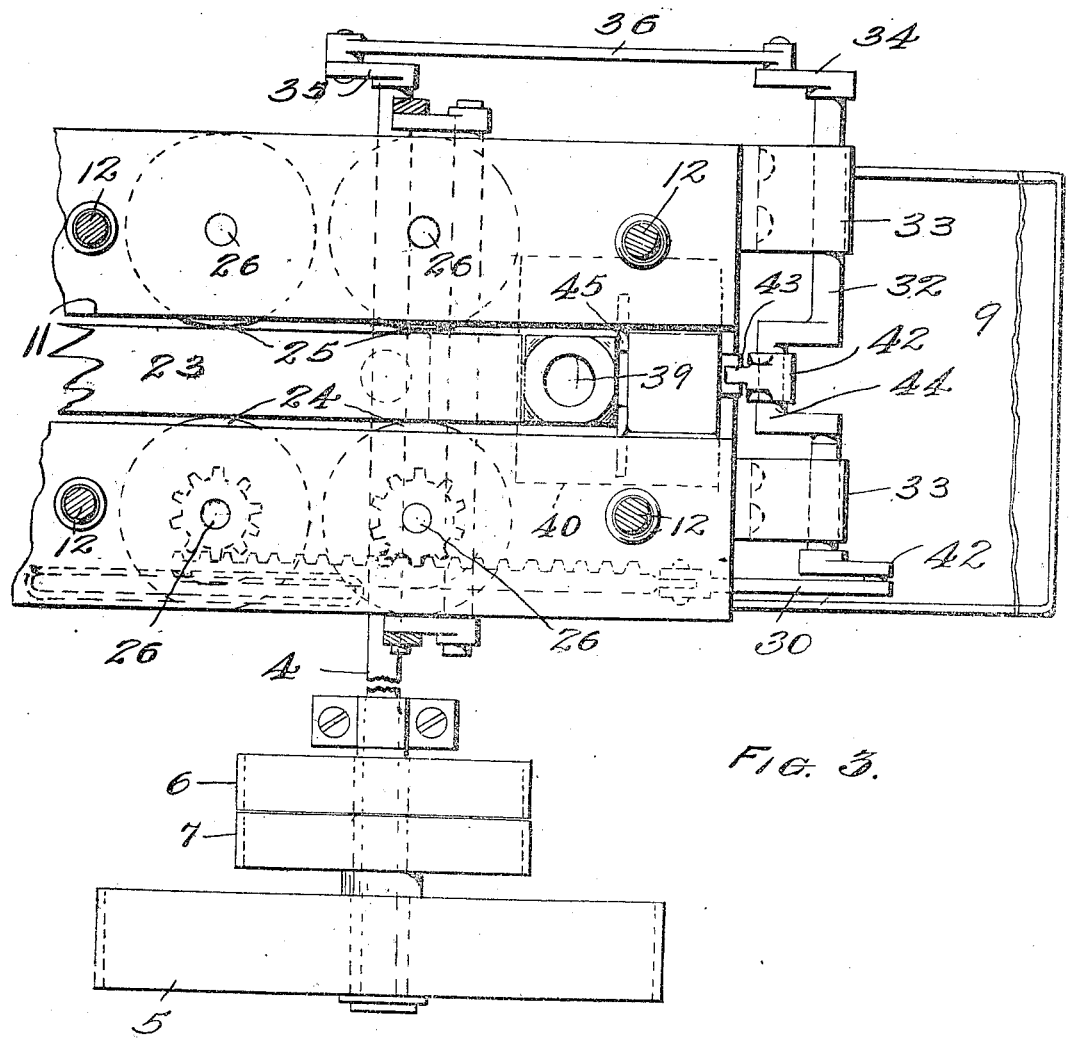
Figure 3A:
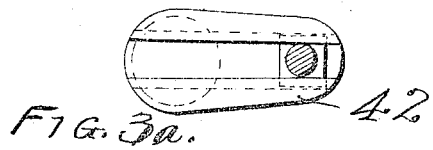

Figure 1 is a side view of the machine, showing the main shaft in section, the driving pulleys and the fly wheel being omitted for convenience of illustration, and the nut-box being shown in section for the same purpose. Fig. 2 is a rear end elevation of the machine. Fig. 3 is a plan view of a portion of the machine the "hammer" and its connections being omitted, and some parts in section, while others are broken away. Fig. 3ª is a detail of a crank arm. Fig. 4 is a fragmentary, sectional view of the machine bed, showing the reciprocating die or slide plate, and the chute for the completed blanks to the nut box. Fig. 5 is a detail view showing the pinion and gear and their respective shafts, for actuating the hammer. Fig. 6 is a detail view showing the manner of retracting the rack bar which actuates the feed rolls for the stock. Fig. 7 is a perspective detail of the slide plate or reciprocating die for the crowner and shear.

The machine bed 1 is of usual or suitable material, size, and shape, provided with the door 2, the bottom flange 3, and is bolted to the floor or platform upon which it rests. The bed supports the main shaft 4, which, is journaled therein and extends transversely therethrough, and carries the fly wheel 5 and tight and loose pulleys 6 and 7 driven by a belt, (not shown) in usual manner. In Fig. 4 it will be seen that a nut chute 8 extends obliquely from the top of the bed to the rear end thereof and opens above a metallic box 9 which is bolted to the end of the bed, and is designed to receive the forged nut blanks.

The head stock 10 which is securely bolted to the top surface of the bed 1, extends from the front to rear thereof and is slotted, as at 11, throughout its length. Rising from the head stock are four studs 12, 12, 12, 12, which are adapted to support and guide the hammer 13 as it vertically reciprocates. The hammer is bored to accommodate the studs which project freely therein, and it is also bored to allow for four springs 14 each one of which encircles a stud and projects up a distance into the hammer. These studs and springs support, guide, and absorb the shocks of the hammer as it reciprocates, and the reciprocatory movement of the hammer is accomplished through the medium of a gear 15 on the main shaft 4 and the pinion 16 on the countershaft 17 which is journaled in the head stock and has its ends projected therethrough. At each end of the countershaft 17 a crank arm 18 is fixed, and by means of links 19 these arms are connected to the trunnions 20 of the hammer. Thus it will be seen that as the countershaft is revolved from the main shaft, the rotation of the crank arms 18 will cause the hammer to reciprocate, being guided on the studs 12, and assisted in its return movements by the resiliency of the springs 14. The hammer is equipped with a punch 21 and a combined shear and crowner 22 securely held therein and properly spaced apart, the shape and size of these tools depending upon the nature of the work to be performed. While the hammer is reciprocated vertically the work is fed horizontally beneath the hammer, and the feed is timed with the movement of the hammer and its dies.

In Fig. 3 the stock or material is designated at 23 as a strip of metal from which the blanks are sheared, and this strip is fed through the slot 11 in the head stock. At each side of the slot a pair of feed rollers as 24, 24, and 25, 25 are located, each revoluble on its vertical shaft 26, and these four rollers are adapted to frictionally contact with edges of the metal strip and feed it forward. The rollers 24, 24 are each provided with a rack wheel 27, 27, and these wheels are each engaged by the rack bar 28 which reciprocates horizontally along the lower edge of the head stock above the bed of the machine. The rack bar is connected by a pivoted link 30 to a crank arm 31 on the crank shaft 32 at the rear of the machine. This crank shaft is supported in bearings 33 at the rear end of the machine, and it is actuated from the main shaft by means of the crank arms 34, 35 and link 36 (see Fig. 4). Thus while the main shaft is revolving, the crank shaft is turned, and the feed arm or rack bar is reciprocated to rotate the feed rolls. The feed rolls are rotated in one direction only of course, and to prevent reverse rotation of the rack wheels, the rack bar 28 is disengaged on its return stroke by the movement of a pin 37 in the continuous slot 38 in the bed of the machine. At the rear of the machine a slide block or anvil 39 is adapted to reciprocate. This block or anvil is provided with lateral wings or extensions 40, 40 adapted to slide in the undercut grooves 41, 41 of the groove 11 in the head stock, and the anvil portion 39 is located centrally of the groove or slot 11 of the head stock. The anvil is located just above the opening in the upper end of the chute 8 of the machine bed, and is adapted to cover and uncover this opening. The reciprocatory movement of the anvil is attained through its connection with the crank shaft 32, a link 42 connected at 43 to the block or anvil, being connected to the crank portion 44 of the shaft.

In operation, with the machine running as described, a strip of steel of suitable size and shape is first heated to the temperature required for the purpose, and then the strip is entered in the slot 11 at the front of the machine, and pushed through the slot until it is engaged by the rollers 24, 25 as shown in Fig. 3. Preferably the machine is timed to work so that as soon as the end of the strip 23 passes beneath the punch 21, said punch will descend and punch the opening through the strip. Then the continuous motion of the machine will feed the strip sufficiently so that the next descent of the hammer will bring the shear and crowner down over the punched end of the strip and shear the end off as it rests upon the anvil. Then the anvil is withdrawn from beneath the sheared and punched blank and the blank drops into the chute 8 and thence into the box 9. At 45, 45 (Figs. 3 and 4) I have indicated pins projecting from opposite sides of the slotted head stock against which the punched end of the strip is pushed, and when the anvil is withdrawn from beneath the sheared blank, these pins will prevent adherence of the blank to the anvil and insure their falling through the chute into the box. Thus the feed of the strip, the punching, shearing, and disposition of the completed, sheared and punched blank are timed, and the continuous operation of the machine causes the continuous steps of the machine to produce the blank as described.

Different sized nuts may be readily made on the machine by feeding different sized strips 23, and it will be understood that different sized rollers 24 and 25 will be used as required.

What I claim is:—

1. The combination in a nut making machine with a reciprocating hammer of a head stock with a slot therethrough for the material, pairs of rollers at each side of the slot and shafts for supporting them, rack wheels on some of said rollers and a rack bar engaging said wheels to rotate them in one direction, a main shaft and a crank shaft, and connections from the rack bar to said crank shaft.

2. The combination in a nut punching machine with a slotted head stock, of a plurality of feed rollers each side of the slot to move the material, a vertically reciprocable hammer above said head stock carrying a punch, a main shaft, and a connected crank shaft for actuating the feed rollers and hammer, whereby the feeding operation and punching operation are rendered successively upon the material.

3. The combination with a slotted head stock and a plurality of rollers on each side of the slot to feed the material, of a plurality of upright studs on the head stock and a bored hammer carrying a punch fitted over said studs, cushioning springs interposed between the head stock and hammer, a crank shaft and connections for actuating the rollers, and a countershaft actuated from the crank shaft and operatively connected with the reciprocable hammer.

4. The combination with the head stock and a plurality of upright studs with cushioning springs, of a bored hammer carrying a punch and fitted over said studs, a countershaft having arms and links connected to the hammer, and means for operating the countershaft comprising a crank shaft and a driving shaft.

In testimony whereof I affix my signature in presence of two witnesses.

WALTER J. SCHMIDT.

Witnesses:
JOSEPH SPANOWSKI,
ARTHUR H. BUSCH.